United States Patent [19]

Bell

[11] 4,288,915
[45] Sep. 15, 1981

[54] COMMUTATOR PULLER

[75] Inventor: Printes G. Bell, Bellwood, Ill.

[73] Assignee: Bell-Terry Automotive Electric, Inc., Chicago, Ill.

[21] Appl. No.: 80,011

[22] Filed: Sep. 28, 1979

[51] Int. Cl.³ .............................................. H02K 15/00
[52] U.S. Cl. ...................................... 29/762; 29/597; 29/733
[58] Field of Search ................. 29/597, 732, 733, 762, 29/764, 426.5, 234, 252; 228/191, 164

[56] References Cited

U.S. PATENT DOCUMENTS 1,800,566  4/1931  Pabst ...................................... 29/762
4,152,822  5/1979  Duff .................................. 29/597 X Primary Examiner—Carl E. Hall
Attorney, Agent, or Firm—Patrick G. Burns

[57] ABSTRACT

A commutator puller for electric motors, alternators, generators and the like has teeth means which hold the commutator while a plunger separates the armature from the commutator. Wire windings soldered to contacts on the commutator may be simultaneously loosened by dipping the commutator, including the winding connections, in a solder bath. While the solder is still molten, the armature is placed in the commutator puller. Power means push the plunger toward the armature. As the plunger moves, a spring associated with the plunger pushes an actuator into a plurality of teeth, forcing the teeth against the commutator to hold it firmly in place. As the plunger continues to move, it pushes the armature away from the commutator. Thus, the commutator contacts are disconnected from the armature windings before the solder hardens. When the power means are disabled, the plunger returns to its original position, relaxing the spring. Tooth springs bring the teeth and actuator away from the commutator, releasing the commutator for removal from the commutator puller.

5 Claims, 7 Drawing Figures

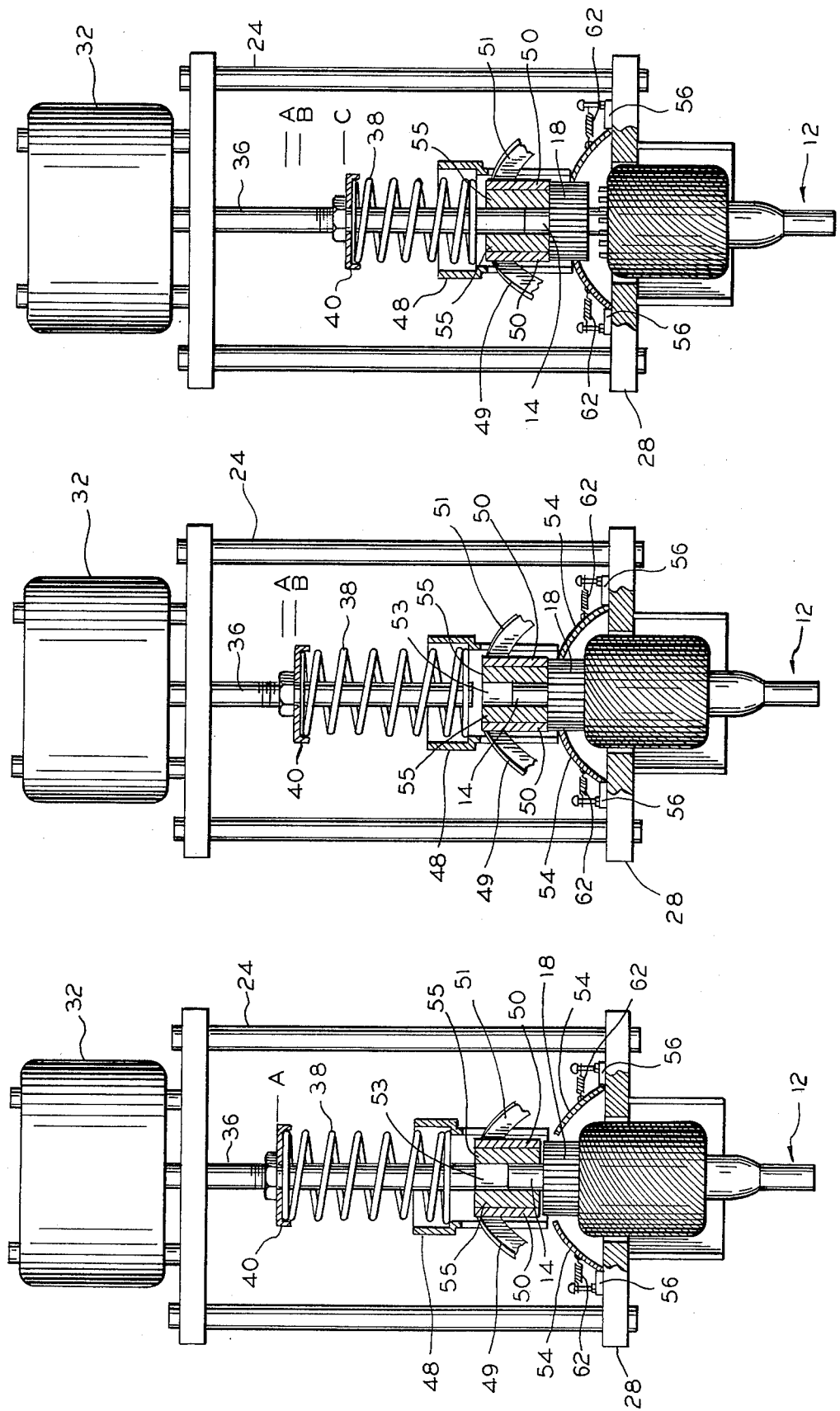

COMMUTATOR PULLER

This invention relates to apparatus for rebuilding an electric motor, alternator, generator, and the like, and more particularly, to apparatus which removes, or pulls, the commutator from the armature of such a device quickly and easily.

BACKGROUND OF THE INVENTION

Electrical devices such as motors, generators, alternators, and the like, including automobile starters, alternators and generators, generally have a housing and an armature which rotates within the housing on a shaft. A stationary set of wire windings is fixed inside the housing, and another set of windings is wrapped around the armature shaft.

A ring commonly known as a commutator fits over the armature shaft adjacent the armature windings. The ends of the windings are soldered to a series of electrical contacts attached to the periphery of the commutator. Electrical current is transmitted to and from the armature windings through brushes attached to the housing which rub across the contacts of the commutator as the armature turns, making an electrical connection with the commutator.

The high cost of new replacement parts for automobiles and the like has created a demand for rebuilt motors, alternators and generators. Generally, when a unit is rebuilt, it is repaired, cleaned and reconditioned. Worn parts are often replaced, even, if they have not yet failed. The commutator contacts are made of metal, and over a period of time become corroded and worn as a result of exposure to the elements and the rubbing of the brushes. Thus, when a unit is rebuilt, the contacts of the commutator are generally resurfaced or replaced.

In the past, most commutator contacts were made of a substantial amount of metal, such as copper. When the unit was rebuilt, the contacts were generally resurfaced, without having to remove the commutator from the armature. However, because of increases in the price of metals such as copper, the use of commutators having metal contacts which are too thin to resurface has become more popular. To rebuild these units, a new commutator must be installed on the armature. If the worn commutator cannot be removed from the armature quickly and easily, the entire armature must be discarded and replaced.

Removal of the commutator is complicated by the fact that each of the contacts is individually soldered to the wires. Unsoldering the connections one at a time with a soldering iron is both tedious and time-consuming, and therefore expensive. Also, when the contacts are unsoldered by hand, the wires are generally moved out of the way as they are unsoldered, and are thereby distorted. When a new commutator is installed, each wire must be reformed. Thus, there is a need for apparatus which will remove a commutator from an armature quickly and easily, without unsoldering each wire connection individually. There is also a need for a commutator puller which does not grievously distort the wires when the commutator is removed.

Thus, an object of the present invention is to provide new and improved apparatus for rebuilding an electric motor, alternator, generator and the like. Another object is to provide new and improved apparatus for removing the commutator from the armature of an electric motor, alternator, generator and the like.

Still another object is to provide new and improved apparatus for removing a commutator from an armature with speed and ease, without unsoldering each wire connection individually, or grievously distorting the wires. Yet another object is to provide new and improved apparatus for removing a commutator from an armature by heating the solder on all of the commutator contacts simultaneously in a solder bath or the like, and removing the commutator before the molten solder hardens.

In keeping with one aspect of this invention, all of the contacts of an armature commutator are dipped in a hot solder bath, melting the solder on all of the wire connections simultaneously. When the solder melts, the commutator is immediately placed in a commutator puller. Power means push a plunger, which moves a spring-operated actuator, and forces a plurality of teeth against the commutator, holding it firmly in place. The plunger then pushes the armature shaft away from the commutator, disconnecting the commutator from the armature before the molten solder hardens. When the power means are disabled, the plunger returns to its original position, relaxing the spring. Tooth springs bring the teeth and actuator away from the commutator, releasing the commutator for removal from the commutator puller.

The above mentioned and other features of this invention and the manner of obtaining them will become more apparent, and the invention itself will be best understood by reference to the following description of an embodiment of the invention taken in conjunction with the accompanying drawings, in which:

FIG. 5 is a partially-cutaway view of the commutator puller of FIG. 1, showing an assembled armature in the commutator puller;

FIG. 6 is a partially cutaway view of the commutator puller of FIG. 5, showing the teeth holding the commutator; and FIG. 7 is a partially cutaway view of the commutator puller of FIG. 5, showing the commutator disconnected from the armature.

DESCRIPTION OF THE PREFERRED EMBODIMENT

Figure 3:
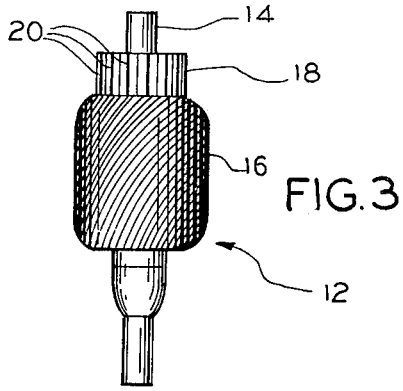
FIG. 3 is an elevation view of an assembled armature, including a commutator.
Figure 4:
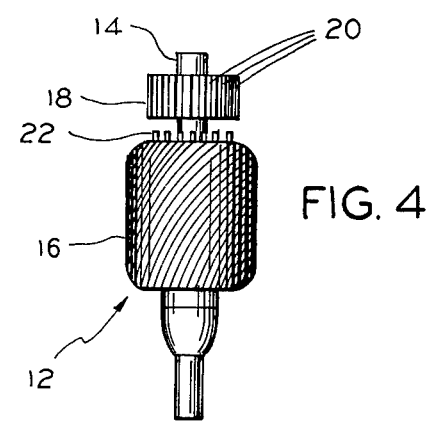
FIG. 4 is an elevation view of an armature showing the commutator disconnected from the windings.

The present invention is intended to be used primarily on the type of armature shown in FIGS. 3 and 4. An armature 12 generally has a shaft 14, a set of windings 16, and a commutator 18 having contacts 20. Ends 22 (FIG. 4) of the windings 16 are soldered to contacts 20. To remove the commutator 18 from the armature 12, each end 22 must be unsoldered from its contact 20. The ends 22 may be unsoldered simultaneously by dipping the commutator 18 and the soldered connections 22 in a commercially available solder bath or the like. When all of the solder on contacts 20 is molten, the armature may be placed in the commutator puller (FIG. 5) and the commutator 18 may be removed from the armature 12 before the molten solder solidifies.

Figure 1:
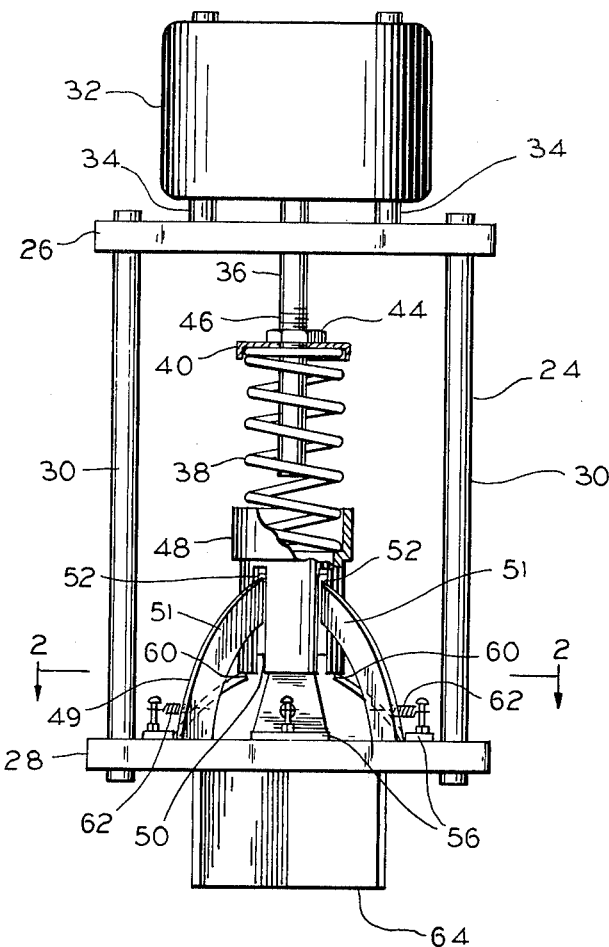
FIG. 1 is a side elevation view of a commutator puller incorporating the principles of the invention.
Figure 2:
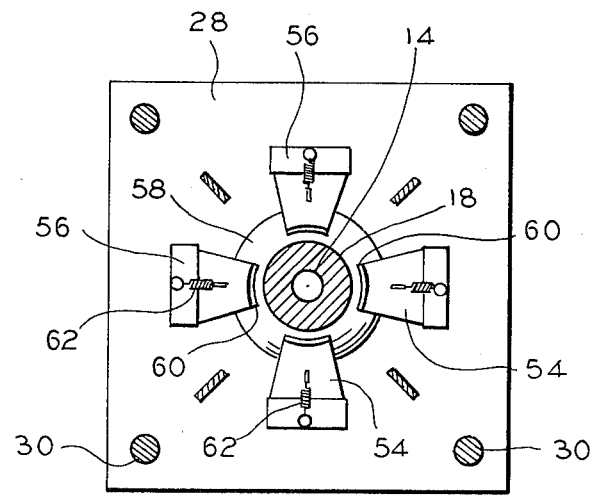
FIG. 2 is a plan view of the commutator puller of FIG. 1 taken along line 2—2 with the actuator removed.

As seen in FIGS. 1 and 2, the commutator puller generally has a frame 24 consisting of two plates 26 and 28 held in spaced relation by posts 30. Power means 32 are attached to top plate 26 by bolts 34, or any suitable means. In the preferred embodiment, a commercially available air cylinder was used, although other power means using electric or manual power could be used, if desired. A plunger 36 extends through an aperture in top plate 26 (not shown), and is operatively connected to power means 32 for movement in both axial directions.

Spring means are operatively connected to the plunger 36. A spring 38 is placed around the plunger 36, abutting a cup 40. The cup 40 is secured to the plunger 36 by any suitable means, such as nuts 44. The nuts 44 are secured to the plunger 36 by threads 46.

An actuator 48 is operatively connected to the end of spring 38 opposite cup 40. The actuator 48 is generally cylindrical in shape, and has a plurality of slots 52 in the lower portion thereof, whose function will be described.

Guide means are provided to properly align the plunger 36 with the armature shaft 14. A guide 49 has a body 50, which slidably fits inside the actuator 48, and legs 51, which extend from the body 50 through the slots 52, and are attached to the bottom plate 28 of the frame 24 by screws or any other suitable means. An aperture 53 (FIGS. 5 and 6) is provided in the center of the body 50 for passage of the plunger 36 and armature shaft 14 therethrough. A collar 55 may be fixed inside the aperture 53 by a set screw or any suitable means to accommodate different sizes of armature shafts. The guide means align the armature shaft 14 (FIGS. 5, 6 and 7) with the plunger 36 and stabilize the armature shaft 14 when the plunger 36 pushes the armature shaft 14 away from the commutator 18.

Gripping means are provided to hold the commutator 18 (FIG. 2) in place while the armature shaft 14 is pushed out, as will also be described. A series of plates 56 are attached to the frame 24 by any suitable means. A plurality of teeth 54 abut the plates 56 and bottom plate 28, for pivotal movement therebetween. The teeth 54 are operatively connected to the actuator 48 by tooth springs 62. The tooth springs 62 also hold the teeth 54 against the plates 56 and bottom plate 28.

An opening 58 is provided in plate 28, through which the commutator and part of the armature shaft and windings pass. Tooth surfaces 60 on teeth 54 press against the commutator 18 (FIG. 6). The surfaces 60 may be shaped and surfaced to provide increased friction against the periphery of the commutator 18.

The distance between the teeth 54 may be adjusted for commutators of varying size by adjusting the nuts 44 on threads 46. As the nuts 44 are turned away from the teeth 54, the teeth springs 62 pull the teeth 54 away from each other. As the nuts 44 are turned toward the teeth 54, the teeth are pushed closer together.

Finally, a support 64 (FIG. 1) is secured to bottom plate 28 by any suitable means, and guides the armature 12 for proper placement in the opening 58 and the guide 49. The support 64 may take any suitable form, such as a "V" shape, or semi-circular shape, corresponding generally to the outer dimensions of the armature.

The operation of the commutator puller is shown in FIGS. 5, 6 and 7. As previously described, the ends 22 of the armature 12 may be unsoldered simultaneously by dipping the commutator 18 and the soldered ends 22 in a commercially available solder bath or the like. When all of the solder is molten, the armature 12 is placed in the commutator puller by guiding the armature along support 64 (FIG. 5) through the opening 58 (FIG. 2) in bottom plate 28 and into the guide 49 until the commutator 18 passes the tooth surfaces 60 (FIG. 5). In practice, the armature 12 may be inserted until the commutator 18 touches the guide 49.

To remove the commutator 18, the operator activates air cylinder 32. The air cylinder drives the plunger 36, together with the spring 38 and actuator 48, axially toward the armature 12, as seen in FIGS. 6 and 7. As the actuator 48 moves toward the armature 12 from position "A" in FIG. 5 to position "B" in FIG. 6, the teeth 54 are forced toward the commutator 18 until the tooth surfaces 60 grip the commutator. As the plunger 36 continues toward the armature shaft 14, the flexibility of spring 38 permits the actuator 48 to stop while the plunger 36 continues to move toward the armature shaft 14.

The plunger 36 continues to move towards the armature 12 from position "B" in FIG. 6 to position "C" in FIG. 7, until it enters the aperture 53 and pushes the armature shaft 14 and windings 16 away from the commutator 18 (FIG. 7). By pushing the armature away from the commutator in this manner, all of the winding ends 22 are disconnected from the commutator 18 virtually simultaneously. Also, the shaft windings 16 remain generally intact, and in the proper position for insertion of a new commutator.

When the armature is removed from the commutator, the operator disables the air cylinder 32, and the plunger 36 returns to its initial position. As the plunger 36 passes point "B" in FIG. 6, spring 38 relaxes and the tooth springs 62 draw teeth 54 and the actuator 48 away from the commutator 18, releasing the commutator for removal from the apparatus. If the apparatus is sufficiently inclined to the ground, the commutator will fall from the apparatus by the force of gravity.

The air cylinder 32 may also be disabled at any time during the cycle if removal of the commutator is impeded for any reason. This may happen, for example, if some of the solder on the windings 16 hardens before the commutator is removed. In this event, the plunger 36 returns to its initial position after the air cylinder 32 is disabled, the spring 38 relaxes, and the tooth springs 62 draw the actuator 48 and teeth 54 away from the commutator 18, releasing the commutator and armature for removal from the commutator puller.

The many advantages of this commutator puller are self-apparent. The commutator may be removed from the armature quickly and easily, without having to unsolder each winding connection individually, and without grievously distorting the wire ends. Also, the winding connections may be unsoldered simultaneously in a solder pot, and the commutator may be removed from the armature before the molten solder solidifies.

While the principles of the invention have been described above in connection with specific apparatus and applications, it is to be understood that this description is made only by way of example and not as a limitation on the scope of the invention.

I claim:

1. A commutator puller for extracting a commutator from an armature having a shaft, windings and commutator comprising:

a frame;

plunger means movably mounted for axial movement with respect to said frame;

power means operatively connected to said plunger means, said power means being selectively operable to move said plunger means axially toward said armature to disconnect said commutator from said armature;

gripping means operatively connected to said plunger means to hold said commutator against axial movement relative to said plunger means; and means to release said commutator from said gripping means;

said gripping means comprising teeth means pivotally mounted to said frame adjacent said plunger means;

actuator means adapted to contact said teeth means and force said teeth means against said commutator; and first spring means operatively connected to said plunger means and said actuator means, whereby movement of said plunger means towards said shaft forces said actuator means against said teeth means to pivot said teeth means into contact with said commutator, said teeth means holds said commutator in place while said plunger means forces said shaft away from said commutator, said plunger means moves away from said shaft after said commutator is extracted from said armature, and said teeth means then releases said commutator.

2. The commutator puller of claim 1 wherein said release means includes second spring means attached to said frame and said teeth means; whereby said second spring means forces said teeth means and said actuator away from said commutator to release said commutator after said shaft has been removed from said commutator.

3. The commutator puller of claim 2 including guide means attached to said frame having an aperture for aligning said plunger means with said armature shaft.

4. The commutator puller of claim 1 wherein said plunger means has a threaded portion, and said first spring means is operatively connected to said plunger means by cup means in combination with nut means held in place on said plunger by said threaded portion.

5. Apparatus for removing a commutator from an armature having a shaft, windings and commutator comprising:

a frame;

first aperture means in said frame;

plunger means movably mounted with respect to said frame;

power means associated with said plunger means for axially moving said plunger means relative to said frame and towards and away from said first aperture means;

first spring means operatively connected to said plunger means;

actuator means operatively connected to said first spring means;

teeth means pivotally mounted on said frame adjacent said first aperture means;

second spring means connected to said frame and said teeth means, operatively connecting said teeth means to said actuator means;

guide means attached to said frame, said guide means having second aperture means for aligning said plunger means with said armature shaft; and support means associated with said frame adjacent said first aperture means for guiding said armature and commutator into said apparatus;

whereby said armature is inserted through said first aperture means and said armature shaft is inserted through said second aperture means in said guide means, said plunger means forces said first spring means, said actuator means and said teeth means towards said armature until said teeth engage said commutator, and said plunger means forces said armature shaft and said windings away from said commutator, said plunger means moves away from said second aperture means and releases said first spring means, and said second spring means forces said teeth means and said actuator means away from said commutator, releasing said commutator for removal from said apparatus.

* * * * *